United States Patent
Simpson et al.

(10) Patent No.: US 7,567,811 B2
(45) Date of Patent: Jul. 28, 2009

(54) MANAGEMENT AND DISPATCHING OF MOBILE SERVICE VEHICLES

(75) Inventors: Richard L. Simpson, Aurora, IL (US); Rahmatollah R. Sohrabi, Oswego, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 147 days.

(21) Appl. No.: 11/144,115

(22) Filed: Jun. 3, 2005

(65) Prior Publication Data

US 2006/0276204 A1 Dec. 7, 2006

(51) Int. Cl.
G06F 15/16 (2006.01)

(52) U.S. Cl. .................. 455/456.5; 455/456.1

(58) Field of Classification Search .............. 455/456.1, 455/457, 115; 342/450, 458; 701/1
See application file for complete search history.

(56) References Cited

U.S. PATENT DOCUMENTS

| | | | | |
|---|---|---|---|---|
| 5,122,959 A | * | 6/1992 | Nathanson et al. | 701/117 |
| 5,253,184 A | * | 10/1993 | Kleinschnitz | 702/184 |
| 5,832,394 A | * | 11/1998 | Wortham | 701/1 |
| 5,870,667 A | * | 2/1999 | Globuschutz | 455/419 |
| 6,411,891 B1 | * | 6/2002 | Jones | 701/201 |
| 6,600,418 B2 | * | 7/2003 | Francis et al. | 340/572.1 |
| 6,862,572 B1 | * | 3/2005 | de Sylva | 705/7 |
| 7,252,230 B1 | * | 8/2007 | Sheikh et al. | 235/439 |

* cited by examiner

*Primary Examiner*—Sam Bhattacharya (57) ABSTRACT

A dispatch hub includes a hub processor and a communications device for communicating with a plurality of field assemblies, which typically are installed in mobile service vehicles. Each field assembly includes a wireless communication device for communicating with the dispatch hub, a geographic positioning device, an RFID reader for reading RFID tags associated with components in the inventory of a service vehicle, and a controller for controlling the collection of field data at the field assembly and forwarding of field data to the dispatch hub. Field data include at least information about the geographic location of the field assembly and component identification data. At the dispatch hub, the need for a specific component at a customer site and the geographic location of the customer site are compared with the forwarded field data to select a service vehicle to travel to the customer site with a needed component.

20 Claims, 4 Drawing Sheets

MANAGEMENT AND DISPATCHING OF MOBILE SERVICE VEHICLES

BACKGROUND OF THE INVENTION

1. Field of the Invention

The invention is related to the field of communication networks, and in particular, to systems and methods for locating and dispatching a mobile service unit.

2. Statement of the Problem

Telecommunication networks characteristically include switching, signal transfer, transmitting and other types of equipment located at numerous geographic locations. Malfunctions in telecommunications networks typically are a result of a malfunction or failure of one or more components of telecommunications equipment. For the repair of network malfunctions, a network administrator typically engages a number of field service technicians who are regularly in the field using a fleet of service vehicles. Generally, a field service dispatcher instructs field service personnel in a particular service vehicle to visit a site of failed equipment and replace broken components of equipment with functional components.

In selecting a particular service vehicle from a vehicle fleet to fix an equipment malfunction in the field, a dispatcher must be certain that the particular vehicle is carrying the component part or parts necessary for fixing the malfunction. When a dispatcher has determined that one or more service vehicles contain the components necessary for fixing a particular malfunction at a particular equipment location, he typically considers several other interrelated factors before instructing a particular vehicle to proceed to the equipment site. One factor is the geographic location of each eligible vehicle relative to the geographic location of the malfunctioning equipment. Another category of factors is the work status and availability of each vehicle and its personnel. That is, a dispatcher must determine if a service vehicle and its team of personnel are currently servicing other equipment at other locations or are scheduled to do so in the immediate future, or if a particular service vehicle is currently available to proceed to the site of malfunctioning equipment. Another related factor is the relative urgency of assistance requests. That is, a dispatcher must determine the relative urgency and importance of substantially simultaneous technical assistance requests.

One problem of current methods and systems of dispatching service vehicles to field locations requiring service and repair of malfunctioning equipment is the lack of current, updated and accurate information necessary for a dispatcher to assign a particular service vehicle and its personnel to a specific task at a specific location. Systems are known that utilize GPS techniques to track and to locate individual delivery trucks in the field in real time. These systems do not, however, generally provide a dispatcher with updated data regarding the identity of good equipment components located in a particular vehicle and available for replacing malfunctioning components in telecommunications equipment. Often, a service vehicle is equipped with a standard array of parts and components each time it departs from a central restocking facility. In some cases, however, a particular component is not in stock and, therefore, not every service vehicle in the fleet carries its standard array of parts. Also, some components are included in the standard array of some vehicles in the field, but not in others. Often, one or more components are no longer contained in a service vehicle because they have been already used during the course of regular service assignments. As a result, the dispatcher at a dispatching center typically initiates voice communications with each individual vehicle in the field to determine if a particular vehicle is carrying a particular component. Sometimes, a dispatcher uses radio to send a general query to all vehicles in the field. In other instances, a dispatcher utilizes standard cell phone technology to call personnel in each vehicle individually. In still other instances, a dispatcher sends an individual or group text message that is received by one or more vehicles in the field. The dispatcher must then rely on a prompt and accurate response from personnel of each service vehicle. Service personnel assigned to a particular vehicle are sometimes too busy to notice or to respond to a query from a dispatcher regarding a particular part or component. Also, service personnel sometimes do not even know if a particular component is in the vehicle. Sometimes, personnel have an incorrect belief regarding the presence or absence of a particular component, and false information is reported back to the dispatcher. Similarly, until the dispatcher receives specific, updated information from a service vehicle regarding its current activity status (e.g., busy or not busy), the dispatcher is unable to assess the availability of service vehicle for assignment to a new assistance request (malfunctioning equipment).

The urgency presented by particular malfunctioning equipment and the relative urgencies of the various technical assistance requests also complicate the task of a dispatcher to assign a particular vehicle from a fleet to a particular geographic location of malfunctioning equipment. For example, a particular equipment malfunction might result in network failure in a relatively large geographic area, while another equipment malfunction might result in minor problems that can be tolerated by the system for a period of time.

Thus, there is a need for systems and methods of selecting a particular service vehicle and its personnel from a fleet of vehicles in the field to repair equipment malfunctions efficiently and effectively at various geographic locations of a telecommunications network.

SUMMARY OF THE SOLUTION

The present invention solves some of the problems described above by providing a centralized management solution for control of a fleet of service vehicles. Systems and methods in accordance with the invention improve the overall efficiency of managing and dispatching mobile service units and of providing service to customers. They minimize service miles traveled by service vehicles and reduce the amount of overtime work done by field personnel.

A basic embodiment of a system of the invention for managing and dispatching service vehicles includes a dispatch hub assembly for installation at a dispatch hub, and a plurality of field assemblies. Each of the field assemblies is suitable for installation in a service vehicle. A field assembly includes a controller operable to collect field data associated with a particular service vehicle and to forward the field data to the dispatch hub. The field data comprises geographic location data of the vehicle and component identification data associated with at least one component in inventory of the vehicle. A field assembly further includes a field wireless device for communicating data, including the field data, with the dispatch hub. A dispatch hub assembly includes a hub communications device for communicating data with the field assemblies. A dispatch hub assembly further includes a hub processor operable to receive the field data from at least one of the field assemblies, to receive a service request indicating a component needed at a customer site, and to process the field data to identify service vehicles having the needed component in their inventory. In some embodiments, a service request also indicates a geographic location of the customer site. Typically, the hub processor is further operable to select one of the service vehicles having the needed component based on a geographic location of the service vehicle relative to the geographic location of the customer site. In some embodiments, the hub processor is further operable to transmit task instructions to the selected service vehicle. Exemplary task instructions include a work order to the selected vehicle to install the needed component at the customer site. In some embodiments, the hub processor is further operable to determine a path between the geographic location of the customer site and the geographic location of the one service vehicle, and to transmit the path to the one service vehicle.

In some embodiments of a system of the invention, each of the field assemblies further comprises a GPS receiver for generating the geographic location data of the service vehicle. In some embodiments, each of the field assemblies further comprises an RFID interrogator for reading an RFID tag associated with a given component to generate the component identification data. Preferred embodiments include a platform for automatically determining equipment topography data at a customer site and providing the equipment topography data to the hub processor. Equipment topography data typically include component information of equipment of a communications network, and information regarding the physical and logical connections between the components. In some embodiments, the dispatch hub assembly further includes a display in the dispatch hub for displaying geographic locations of each service vehicle on a digital map. In some embodiments, the field assembly further includes a display for displaying a geographic location of the customer site on a digital map. In some embodiments, the controller of each field assembly is configured to automatically collect the geographic location data using a GPS receiver of the field assembly and to automatically collect the component identification data using an RFID interrogator of the field assembly.

A method of the invention for managing and dispatching service vehicles generally includes generating field data associated with each of a plurality of service vehicles. The field data comprises geographic location data of a service vehicle and component identification data associated with at least one component in inventory of the vehicle. A method further includes collecting the field data associated with each service vehicle, forwarding the field data from each service vehicle to a dispatch hub processor using a field wireless device, and receiving the field data at the dispatch hub processor. A method further includes receiving a service request at the dispatch hub processor. A service request indicates at least a component needed at a customer site. A method further includes processing the field data and the service request to identify service vehicles having the needed component in their inventory. In some embodiments, the service request also indicates a geographic location of the customer site. In some embodiments, the service request indicates a geographic location of malfunctioning equipment and a component needed for the malfunctioning equipment. Some embodiments of a method of the invention further include determining a path between the geographic location of the customer site and a geographic location of a service vehicle. Some embodiments further include selecting one of the service vehicles having the needed component based on a geographic location of the one service vehicle relative to the geographic location of the customer site. Some embodiments further include transmitting a work order to the one service vehicle to install the needed component at the customer site. Some embodiments further include generating equipment topography data and transmitting the equipment topography data to the one service vehicle. Some embodiments include automatically collecting field data in each service vehicle. Some embodiments include automatically forwarding field data in each service vehicle to the dispatch hub processor.

The invention may include other exemplary embodiments described below.

DESCRIPTION OF THE DRAWINGS

The same reference number represents the same element on all drawings.

DETAILED DESCRIPTION OF THE INVENTION

FIGS. 1-4 depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
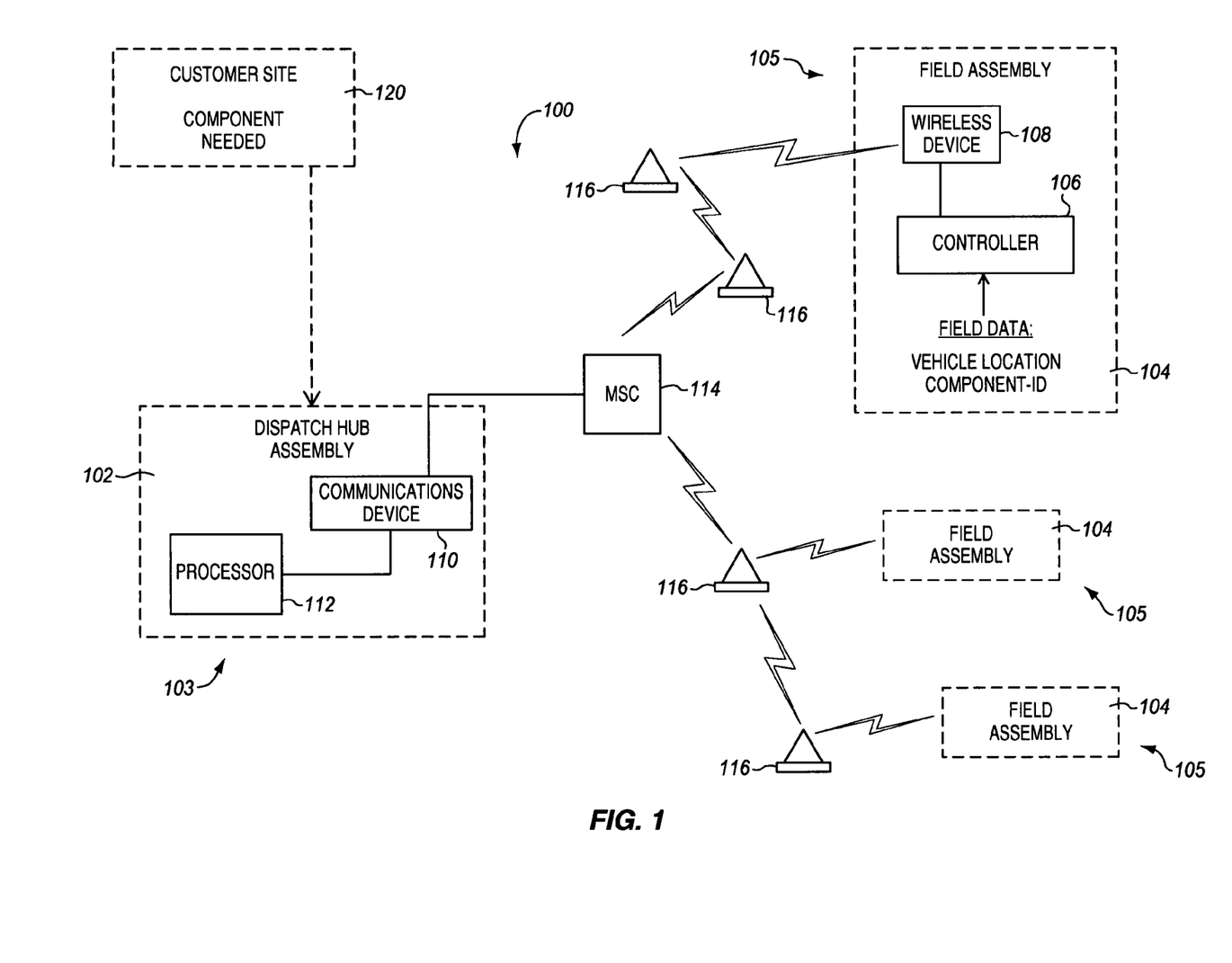
FIG. 1 depicts schematically a system of the invention for selecting a mobile service vehicle from a fleet of service vehicles.

FIG. 1 illustrates schematically a management and dispatching system 100 in accordance with the invention for selecting a mobile service vehicle from a fleet of service vehicles and dispatching the vehicle to a customer site with one or more components needed at the customer site. Dispatching system 100 includes a dispatch hub assembly 102 for operation at a dispatch hub 103 and a plurality of field assemblies 104, each field assembly typically installed in a mobile service vehicle 105. Each field assembly 104 includes a controller 106 operable to collect field data associated with a particular service vehicle and to forward the field data to dispatch hub 103. Field data typically comprises at least geographic location data of a particular vehicle and component identification ("component ID") data associated with a current inventory of components in the vehicle. Each field assembly 104 also includes a field wireless device 108 for communicating data, including field data, with dispatch hub 103. Dispatch hub assembly 102 comprises a hub communications device 110 for communicating data with field assemblies 104 and a hub processor 112 (e.g., CPU), which is operable to receive field data from at least one of the field assemblies 104, to receive a service request indicating a component needed at a customer site 120, and to process the field data to identify service vehicles having a needed component in their inventory. As depicted in FIG. 1, wireless communications between field assemblies 104 and dispatch hub 103 are typically conducted using a public wireless communications network having a mobile switching center (MSC) 114 and base stations 116. It is understood, however, that other methods and systems of wireless communication known in the art are suitable for conducting data communications between field assemblies 104 and dispatch hub 103. Field wireless device 108 of each field assembly 104 typically comprises a data phone using CDMA, TDMA, GPRS or other conventional communications technology.

Field data forwarded by field assemblies 104 to dispatch hub assembly 102 are useful at dispatch hub 103 for identifying one or more service vehicles that have in their current inventory one or more components that are needed or desired at customer site 120. Preferably, the data is also useful for identifying a service vehicle that is geographically closer to a customer site 120 than other vehicles. In practice, therefore, dispatch hub 103 possesses information about the customer site that is compared in some sense to the forwarded field data. Typically, at least some customer site information (e.g., the identity of a currently needed component) is transmitted to dispatch hub assembly 102 in the form of a service request. Service requests typically are communicated by customer personnel using standard communications methods, such as e-mail, telephone, website entries, and written hard copy communications. Also, in some embodiments, service requests are generated automatically by a customer system under various circumstances, such as in cases of equipment malfunction and regular maintenance scheduling, among others. In other applications, customer site information is generated, complemented, supplemented or regularly stored on record at dispatch hub 103. The term "service request", therefore, is used broadly in this specification to mean data of one or several origins pertaining to a customer site and its equipment that is used at a dispatch hub in selecting a service vehicle to provide service at a customer site. The term "customer site" is used to designate the location of one or more components, typically components of network communications equipment that are needed. Customer site information in a service request typically includes at least a component type of one or more components needed or desired at the customer site. Other exemplary customer site information includes the geographic location of the customer site and information indicating the importance and urgency of a service request. For example, such information indicates variously the occurrence or imminence of a system failure or a subsystem failure, the presence of backup and redundant equipment at the customer site, and whether the service request is a result of equipment malfunction or regular scheduled maintenance.

Hub processor 112 is used for receiving and processing forwarded field data received from field assemblies 102 to identify one or more service vehicles having a needed component. In some embodiments, processor 112 stores forwarded field data, which is then available for comparison with customer site information to match component needs of a customer site with component availability in various service vehicles, and also to match the geographic location of the customer site with the geographic location of one or more service vehicles that have desired components in inventory. In preferred embodiments, hub processor 112 processes customer site information, including information provided in a service request, as well as field data. Preferably, hub processor 112 also includes software solutions for appropriately analyzing data to select a particular service vehicle efficiently. The term "service vehicle" and related terms are used broadly in this specification to designate any mobile unit carrying one or more equipment components and located at a particular geographic location that is subject to being dispatched to a customer site at a different location. Thus, the term service vehicle includes a bicycle, a pushcart, a backpack an airplane and a helicopter, among others. Typically, a service vehicle is a small van or truck carrying an inventory of components and operated by one or two service personnel.

Figure 2:
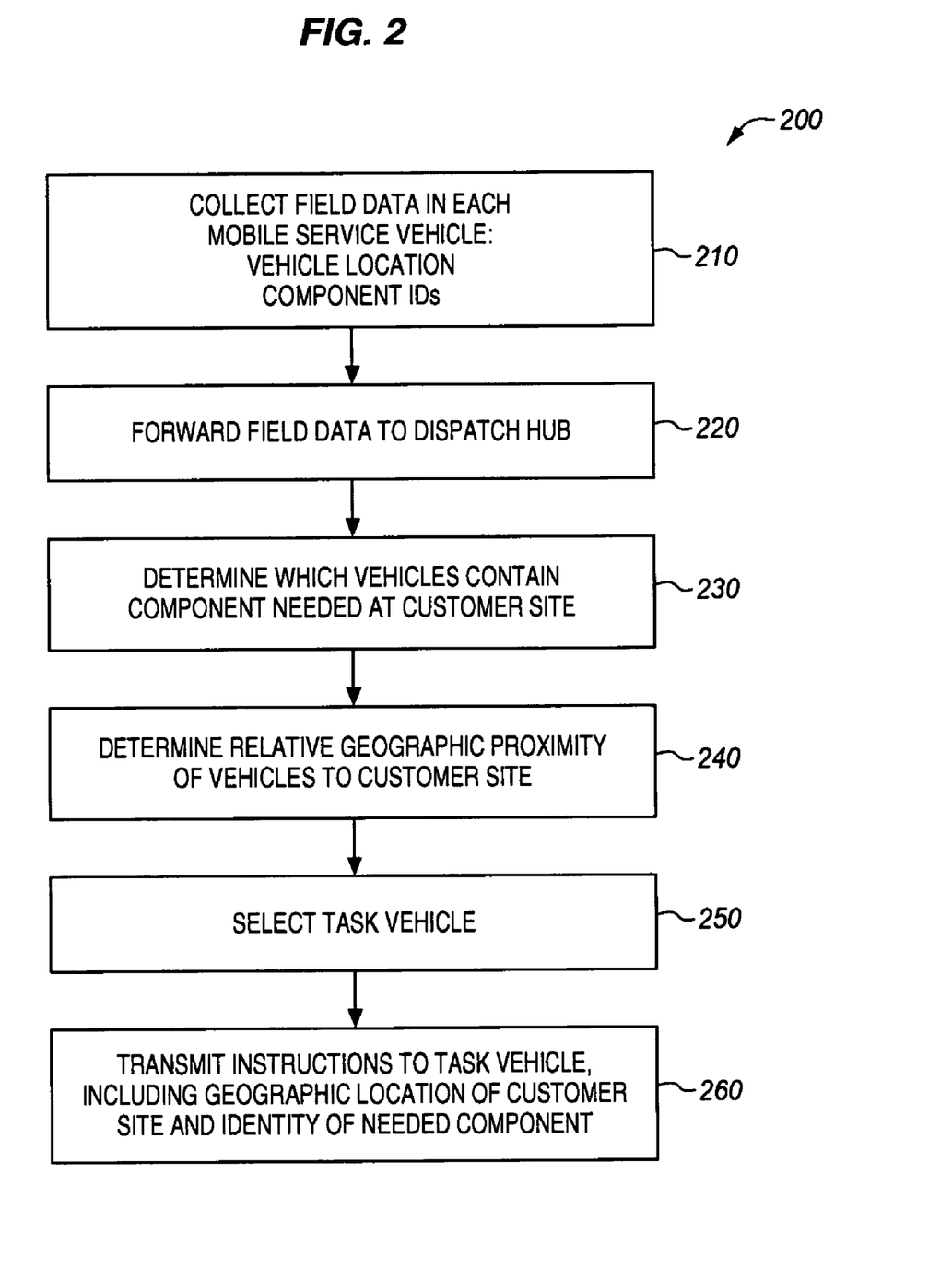
FIG. 2 includes a process flow sheet of a basic method in accordance with the invention for selecting a particular service vehicle from a fleet of service vehicles to provide a particular component type at a customer site.

FIG. 2 illustrates a process flow sheet of a generalized method 200 in accordance with the invention for selecting a particular service vehicle from a fleet of service vehicles to provide a particular component at a customer site. Method 200 is explained with reference to system 100 of FIG. 1. It is understood, however, that methods in accordance with the invention are also practiced using systems that are different from system 100. In process 210, field data are collected by controller 106 of field assembly 104 of one or more service vehicles 105. Field data typically comprises at least the geographic location of a particular service vehicle and component identification ("component ID") data that identify one or more components in the inventory of a particular service vehicle. In process 220, field data from one or more field assemblies 104 are forwarded via wireless device 108 to a dispatch hub 103, where it is processed in hub processor 112. In process 230, one or more vehicles, if any, are identified that include one or more component types needed at a customer site 120. In process 240, the geographic location of one or more vehicles 105 containing the needed component or components is compared to the geographic location of customer site 120. This comparison is used in processes 250 to select a particular "task vehicle" to which is assigned the task of proceeding to the customer site and delivering or installing needed components. In processes 260, task instructions, typically in the form of a work order, are transmitted from dispatch hub 103 to a selected task vehicle. The task instructions typically include at least the geographic location of the customer site and component identification data of components needed at the site.

Figure 3:
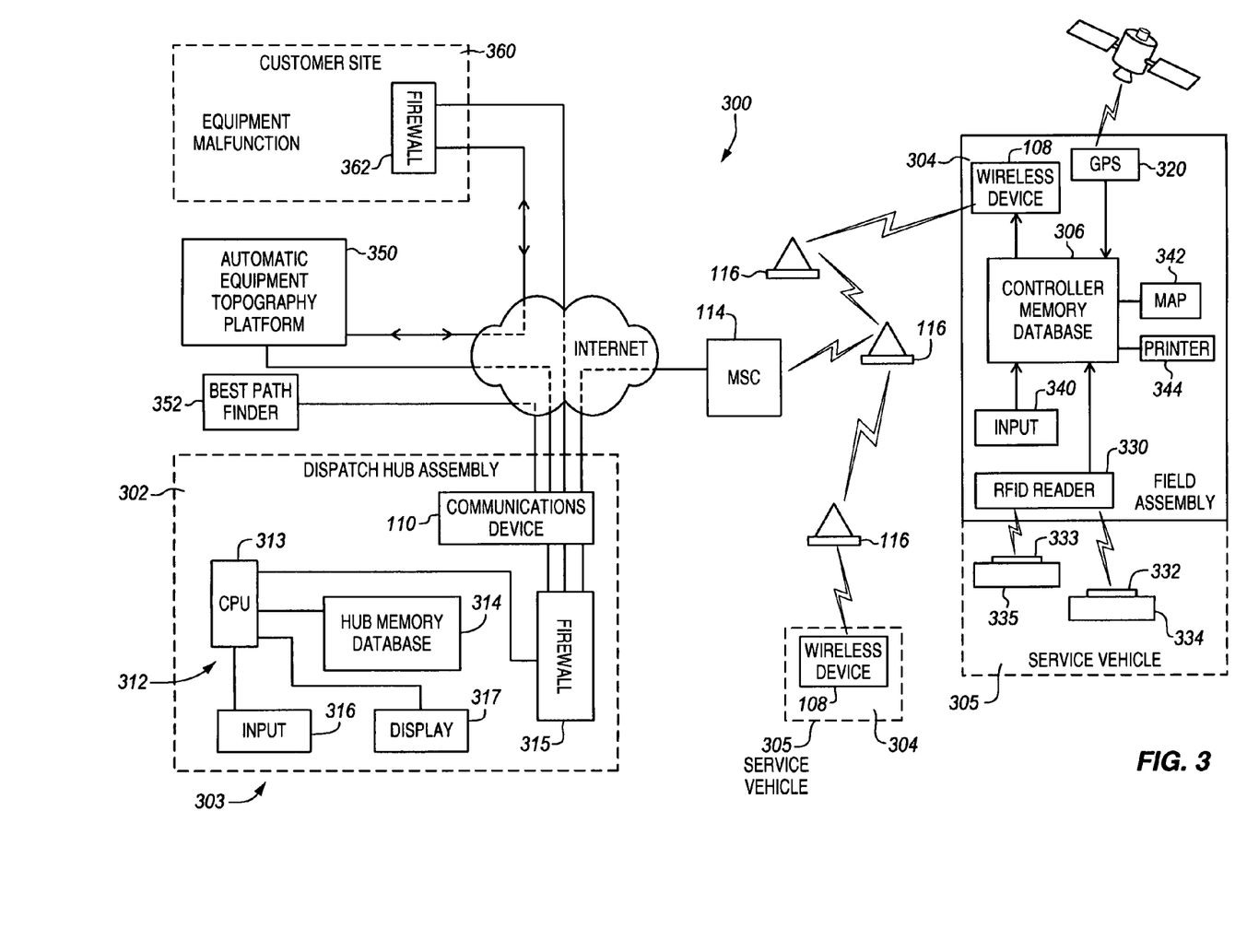
FIG. 3 illustrates schematically a web based management and dispatching system in accordance with the invention for selecting a mobile service vehicle from a fleet of service vehicles to fulfill a service request.

FIG. 3 illustrates schematically a web based management and dispatching system 300 in accordance with the invention for selecting a mobile service vehicle from a fleet of service vehicles to fulfill a service request. Dispatching system 300 includes a dispatch hub assembly 302 for operation at a dispatch hub 303 and a plurality of field assemblies 304, each field assembly typically installed in a mobile service vehicle 305. Each field assembly 304 includes a controller 306 for collecting field data associated with a particular service vehicle and for forwarding the field data to dispatch hub 303. An exemplary controller 306 comprises a CPU and a memory including a database for collecting, storing and forwarding field data. Field data typically comprises at least geographic location data of a particular vehicle and component identification data associated with a current inventory of equipment in the vehicle. Each field assembly 304 also includes a field wireless device 108 for communication of data, including forwarding field data, with dispatch hub 303. Dispatch hub assembly 302 comprises a hub communications device 110, for communicating data with field assemblies 304, and a hub processor 312. Hub processor 312 is operable to receive field data from at least one of field assemblies 304, to receive a service request indicating a component needed at a customer site 360, and to process the field data to identify service vehicles having one or more needed components in their inventory. As depicted in FIG. 3, hub processor 312 comprises a CPU 313 and a memory 314 including a database. As further depicted in FIG. 3, wireless communications between field assemblies 304 and dispatch hub 303 are conducted using the public internet and a public wireless communications network having a mobile switching center 114 and base stations 116. Preferred embodiments comprise a firewall 315 between wireless device 110 and CPU 313. In preferred embodiments, as depicted in FIG. 3, dispatch hub assembly 302 includes an input device 316 for entering data into processor 312 and a display 317 for displaying digital information, such as digital web based maps and data included in CPU 313 and memory 314.

Each field assembly 304 further comprises a GPS receiver 320 or other location indicating device for generating geographic location data of a particular service vehicle 305. Each field assembly 304 further comprises an RFID reader 330 for reading an RFID tag 332, 333 associated with given components 334, 335, respectively, to generate component identification data of components 334, 335 located in a service vehicle 305. By activating RFID reader 330 to read the RFID tags, it is possible to conduct an accurate inventory of all components in a particular service vehicle at any time. RFID readers and RFID tags are well known in the art. An RFID tag associated with some components for their identification is affixed to a component or embedded in the component using known technology. An RFID tag associated with other components is attached to a component holder, for example, to a container or a rack, suitable for holding one or more components of a particular type. This technique is especially useful for small components and for fragile components and in other cases in which it is impractical to physically attach an RFID tag to the component. In some embodiments in which an RFID tag is attached to a component holder instead of to the component itself, the RFID tag includes information regarding the quantity of components currently in the holder. The quantity information typically is updated by service personnel using an RFID writer.

As depicted in FIG. 3, a field assembly 304 of preferred embodiments of system 300 comprises a field input device 340, which service personnel use to provide some additional field data, such as the identity of personnel currently operating a service vehicle and job status data. Job status data is useful for providing information to dispatch hub 303, particularly to hub processor 312, regarding the status of tasks previously assigned to a particular service vehicle and its personnel. Such information is useful at dispatch hub 303 for evaluating the availability of a particular service vehicle and its team of personnel for answering a new service request. In preferred embodiments of a system 300, field assembly 304 further comprises a digital display monitor 342 and/or a printer 344 for displaying information, such as a digital web based map and task instructions.

An exemplary field assembly includes a stand-alone modular unit having a GPS receiver, an RFID reader, an integral data modem and a wireless phone. The exemplary field assembly further includes a separate 12 VDC power supply. Some embodiments further include one or more of a manual data input device, a printer, and a display monitor. Some embodiments comprise a Win 32 software solution that enables communication over the public wireless network between a dispatch hub assembly and field assemblies in service vehicles.

In some embodiments, controller 306 of each field assembly 304 is configured to automatically collect geographic location data using GPS receiver 320 (or other locating device), and to automatically collect component identification data using RFID interrogator 330, and to store the data in memory at frequent controlled time points (e.g., every two minutes). As a result, current, accurate field data are stored and always ready for forwarding to dispatch hub 303. In some embodiments, controller 306 is configured to automatically forward geographic location data and component identification data at frequent controlled time points (e.g., every two minutes) to processor 312 at dispatch hub 302. As a result, current, accurate field data are stored and ready for use at dispatch hub 303.

In other embodiments, controller 306 is configured to automatically forward geographic location data and component identification data to dispatch hub 303 after controller 306 receives a polling command from dispatch hub 303. In still other embodiments, controller 306 of each field assembly 304 is configured to automatically collect geographic location data and component identification data after receiving a polling command from dispatch hub 303 and then to automatically forward the collected field data to dispatch hub 303. In some embodiments, polling commands are generated and automatically transmitted to one or more service vehicles 305 at frequent, controlled time points.

Preferred embodiments of a system 300 further comprise an automatic equipment topography platform 350 (or equivalently, access to digital information generated by such a platform). A platform 350 automatically determines equipment topography data at a customer site and provides the equipment topography data to hub processor 312 of dispatch hub assembly 302. Equipment topography data typically includes component information of equipment of a communications network and the physical and logical connections between equipment components. This information typically is valuable and often essential information used by personnel of the selected service vehicle to perform an assigned task at a customer site. An example of a commercially available web based automatic equipment topography platform is NetInventory of Lucent Technologies Inc.

Preferred embodiments of a system 300 further comprise a conventional best path finder system 352 (or equivalently, access to digital information generated by such a system) for determining a best path between a service vehicle 305 and a customer site 360. U.S. Pat. No. 6,813,247, issued Nov. 2, 2004, to Hassan, which is hereby incorporated by reference, teaches a traffic reporting system that utilizes wireless technology to efficiently provide traffic information specifically targeted to a user of a wireless unit.

In preferred embodiments of a system 300 in accordance with the invention, one or more customer sites 360 are connected via Internet communication pathways, as depicted in FIG. 3, or through other conventional data communication links, to dispatch hub assembly 302 and equipment topography platform 350. Customer site 360 comprises internet firewall 362. As described above, with reference to FIG. 1, customer site 360 typically generates and transmits a service request using one or several conventional means of data preparation and communication.

Hub processor 312 of dispatch hub 303 typically sends task instructions (e.g., a work order) via hub wireless device 110 through field wireless device 108 to a mobile service vehicle 305 that has one or more components needed at the customer site.

Figure 4:
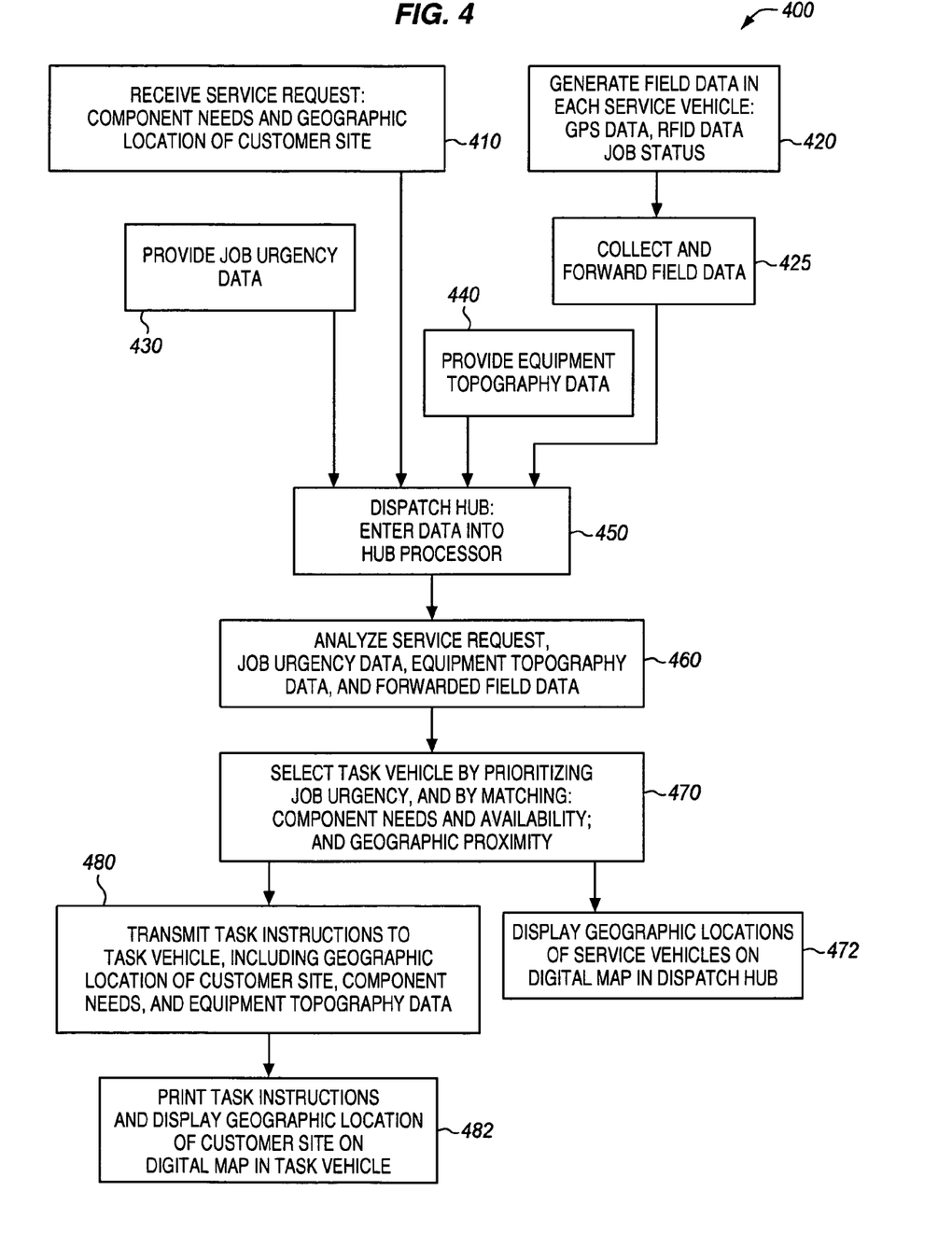
FIG. 4 illustrates a process flow sheet of a method in accordance with the invention for selecting a particular service vehicle from a fleet of service vehicles to provide a particular component at a customer site.

FIG. 4 illustrates a process flow sheet of a preferred method 400 in accordance with the invention for selecting a particular service vehicle from a fleet of service vehicles to provide a particular component type at a customer site. Method 400 is explained with reference to system 300 of FIG. 3. It is understood, however, that methods in accordance with the invention are also practiced using equipment and apparatuses that are different from those included in system 300. Process 410 includes receipt at dispatch hub 303 of a service request associated with a customer site 360. Generally, a service request includes information identifying one or more components required or desired at customer site 360. Information regarding the geographic location of customer site 360 typically is provided in a service request or is continuously available to dispatch hub 303.

Processes 420 include generating field data in each service vehicle 305. Generally, as discussed with reference to FIG. 3, data for determining the geographic location in the field of a particular service vehicle is generated using a GPS receiver 320, and component identification data typically are generated by a RFID reader 330. In some embodiments, controller 306 of each field assembly 304 is configured to automatically prompt GPS receiver 320 to generate geographic location data and to automatically prompt RFID interrogator 330 to generate component identification data at periodic time intervals. In other embodiments, controller 306 receives a polling command from dispatch hub 303, and in response to the polling command, prompts GPS receiver 320 and RFID interrogator 330 to generate geographic location data and component identification data, respectively. Job status data typically are generated by service personnel who evaluate the degree of completion of tasks previously assigned to a vehicle and enter job status data in controller memory using a conventional input device 340.

Processes 425 include processes of collecting the field data and forwarding the field data via wireless communications device 108 for receipt by dispatch processor 312. As explained above, processes of collecting and forwarding field data typically are performed by controller 306 periodically or in response to a polling command from dispatch hub 303.

Processes 430 include providing job urgency data and receiving it at dispatch hub 303. In some embodiments, job urgency data is provided along with a service request from a customer site 360. In other embodiments, analysis and evaluation of the urgency of a service request and a determination of the priority that should be assigned to a service request is conducted at dispatch hub 303 based on knowledge of the network equipment located at customer site 360. In some embodiments, based on information in a service request, the analysis and evaluation is conducted automatically to generate a job urgency valuation. In other embodiments, personnel at dispatch hub 303 assign a quantifying value to prioritize a service request and enter the value using input device 316 into hub processor 312.

Processes 440 include generating equipment topography data and supplying the data to hub processor 312. In some embodiments, equipment topography data are generated in response to a particular service request. Generally, however, equipment topography data are generated and updated at regular, controlled time intervals and maintained in hub memory 314.

Processes 450 include the receipt, input and recording of a service request, field data, job urgency data and equipment topography data at hub processor 450, all of which is performed using techniques and equipment known in the art. Processes 460 include analysis by hub processor 312 of the service request from customer site 360 and field data from one or more service vehicles 305. In a broad sense, processes 460 include comparing the component identification data of components 334, 335 in current inventory of service vehicles to the component identity of components needed or desired at customer site 360, and then matching components available in a service vehicle with the components needed at the customer site. Process 460 also include comparing the geographic location of one or more service vehicles 305 carrying one or more desired components with the geographic location of customer site 360 to minimize the prospective travel time of one or more available service vehicles to the customer site. In some embodiments, job status data from one or more service vehicles is considered during processes 460 in determining the availability of particular service vehicles for prospective assignment to a new task. In preferred embodiments, processes 460 include analysis of job urgency data, which provide information for comparing the relative urgency of a plurality of prospective and current service requests and for enabling a systematic prioritization of service resources.

Processes 470 typically include selection of a particular vehicle, that is, a "task vehicle", for dispatch to customer site 360 with one or more needed or desired components. It is understood, however, that in some instances, processes 460 and 470 result in no selection of a service vehicle to meet a particular service request. For example, if none of the vehicles have a required component in their current inventory, then none are selected to proceed immediately to customer site 360. Similarly, if one or more of the vehicles have a required component in inventory, but are located a relatively long distance from the customer site, then sometimes a decision is made to delay servicing of the customer site. Also, sometimes even if a service vehicle has a required component type in inventory and is located within a practical distance range of the customer site associated with a service request, it is not ordered to the customer site if another service request has a higher priority. In some embodiments, analysis process 460 and selection process 470 are conducted automatically by processor 312 according to computerized numerical methods known in the art of cost/benefit analysis and value maximization. In other embodiments, analysis processes 460 and selection processes 470 are performed by one or more persons using prescribed guidelines. In still other embodiments, analysis processes 460 and selection processes 470 are conducted using a combination of computerized tools, such as spreadsheets, and human judgment. In preferred embodiments, the geographic locations of various service vehicles are displayed on digital maps using display monitor 317.

When one or more particular vehicles are selected to provide service at a customer site to fulfill a service request, then task instructions are transmitted in processes 480 to one or more selected vehicles, that is, to task vehicles. The task instructions typically include the geographic location of the customer site and a work order to install one or more needed components at the customer site. Preferably, task instructions also include equipment topography data and best path information provided by best path finder 352. In processes 482, task instructions are typically printed at a printer 344 of field assembly 304 in the task vehicle, or are displayed on a display monitor 342 of field assembly 304, or both. In some embodiments, one or more digital maps showing the geographic locations of the customer site and the task vehicle are displayed in processes 482.

Systems and methods in accordance with the invention improve the overall efficiency of managing and dispatching mobile service units and of providing service to customers. They minimize service miles traveled by service vehicles and reduce the amount of overtime work done by field personnel. The particular systems and methods described herein are intended to illustrate the functionality and versatility of the invention, but should not be construed to be limited to those particular embodiments. Systems and methods in accordance with the invention are useful in a wide variety of circumstances and applications to select a service vehicle for dispatch to a customer site. It is evident that those skilled in the art may now make numerous uses and modifications of the specific embodiments described, without departing from the inventive concepts. It is also evident that the steps recited may, in some instances, be performed in a different order; or equivalent structures and processes may be substituted for the structures and processes described. For example, in some embodiments, processes 240 of method 200 in FIG. 2 are conducted before processes 230. Since certain changes may be made in the above systems and methods without departing from the scope of the invention, it is intended that all subject matter contained in the above description or shown in the accompanying drawings be interpreted as illustrative and not in a limiting sense. Consequently, the invention is to be construed as embracing each and every novel feature and novel combination of features present in or inherently possessed by the systems and methods described in the claims below and by their equivalents.

We claim:

1. A system useful for dispatching service vehicles, comprising:
    a dispatch hub assembly for installation at a dispatch hub; and
    a plurality of field assemblies, each of said field assemblies being suitable for installation in a service vehicle; wherein each field assembly comprises:
        a controller operable to collect field data associated with a specified particular service vehicle and to forward said field data to said dispatch hub, said field data comprising geographic location data of said vehicle and specified component identification data associated with at least one specified component in inventory of said vehicle; and
        a field wireless device for communicating data, including said field data, with said dispatch hub; and
    wherein said dispatch hub assembly comprises:
        a hub communications device for communicating data with said field assemblies;
        a hub processor operable to receive said field data from at least one of said field assemblies, to receive a service request indicating a specified component needed at a customer site, and to process said field data to identify service vehicles having said needed specified component in their inventory; wherein said hub processor is responsive to the receipt of said service request to select one of said service vehicles having said needed specified component specified by said received service request.

2. A system as in claim 1 wherein said service request indicates a geographic location of said customer site.

3. A system as in claim 2 wherein said selection of said one service vehicle is based on a geographic location of said one service vehicle relative to said geographic location of said customer site.

4. A system as in claim 3 wherein said hub processor is responsive to the receipt of said service request to transmit a work order to said one service vehicle to install said needed specified component at said customer site specified by said service request.

5. A system as in claim 4 wherein the hub processor is further operable to determine a path between said geographic location of said customer site and said geographic location of said one service vehicle, and to transmit said path to said one service vehicle.

6. A system as in claim 1 wherein each of said field assemblies further comprises:
    a GPS receiver for generating said geographic location data of said service vehicle.

7. A system as in claim 1 wherein each of said field assemblies further comprises:
    an RFID interrogator for reading an RFID tag associated with a given specified component to generate said specified component identification data.

8. A system as in claim 1 further comprising:
    a platform for automatically determining equipment topography data at a customer site and providing said equipment topography data to said hub processor, said equipment topography data including specified component information of equipment of a communications network and connections between said specified components.

9. A system as in claim 1 wherein said dispatch hub assembly further comprises:
    a display in said dispatch hub for displaying geographic locations of each service vehicle on a digital map.

10. A system as in claim 1 wherein each field assembly further comprises:
    a display for displaying a geographic location of said customer site on a digital map.

11. A system as in claim 1 wherein:
    said controller of each field assembly is configured to automatically collect said geographic location data using a GPS receiver of said field assembly and to automatically collect said specified component identification data using an RFID interrogator of said field assembly.

12. A method useful for dispatching service vehicles, comprising:
    generating field data associated with each of a plurality of service vehicles, wherein said field data comprises geographic location data of a service vehicle and specified component identification data associated with at least one specified component in inventory of said vehicle;
    collecting said field data associated with each service vehicle;
    forwarding said field data from each service vehicle to a dispatch hub processor using a field wireless device;
    receiving said field data at said dispatch hub processor;
    receiving a service request at said dispatch hub processor, said service request indicating a specified component needed at a customer site; and
    processing said field data and said service request to identify service vehicles having said needed specified component in their inventory.

13. A method as in claim 12, wherein said service request indicates a geographic location of said customer site.

14. A method as in claim 13, wherein said service request indicates:
    a geographic location of malfunctioning equipment; and
    Pg,19
    a specified component needed for said malfunctioning equipment.

15. A method as in claim 13, further comprising:
    determining a path between said geographic location of said customer site and a geographic location of a service vehicle.

16. A method as in claim 13, further comprising:
    selecting one of said service vehicles having said needed specified component based on a geographic location of said one service vehicle relative to said geographic location of said customer site.

17. A method as in claim 16, further comprising:
    transmitting a work order to said one service vehicle to install said needed specified component at said customer site.

18. A method as in claim 16, further comprising:
    generating equipment topography data, said equipment topography data including specified component information of equipment of a communications network and of connections between said specified components; and transmitting said equipment topography data to said one service vehicle.

19. A method as in claim 12 wherein collecting field data comprises:

automatically collecting field data in each service vehicle.

20. A method as in claim 12 wherein forwarding field data comprises:

automatically forwarding field data in each service vehicle to said dispatch hub processor.

* * * * *